United States Patent
Li et al.

(10) Patent No.: US 12,554,244 B2
(45) Date of Patent: Feb. 17, 2026

(54) 3D MODEL FILE STORAGE METHOD, 3D MODEL FILE RECONSTRUCTION METHOD AND 3D PRINTING METHOD

(71) Applicant: PHROZEN TECH CO., LTD., Hsinchu (TW)

(72) Inventors: Chang Hsien Li, Hsinchu (TW); Yi Jen Wu, Hsinchu (TW); Ko Wei Shih, Hsinchu (TW)

(73) Assignee: PHROZEN TECH CO., LTD., Hsinchu (TW)

( * ) Notice: Subject to any disclaimer, the term of this patent is extended or adjusted under 35 U.S.C. 154(b) by 461 days.

(21) Appl. No.: 18/137,216

(22) Filed: Apr. 20, 2023

(65) Prior Publication Data

US 2024/0272611 A1    Aug. 15, 2024

(30) Foreign Application Priority Data

Feb. 3, 2023 (TW) ................................. 112103779

(51) Int. Cl.
| G06T 17/20 | (2006.01) |
| B33Y 50/00 | (2015.01) |
| G05B 19/4099 | (2006.01) |
| G06T 19/00 | (2011.01) |

(52) U.S. Cl.
CPC .......... *G05B 19/4099* (2013.01); *B33Y 50/00* (2014.12); *G06T 17/20* (2013.01); *G06T 19/00* (2013.01); *G05B 2219/35134* (2013.01); *G05B 2219/49023* (2013.01); *G06T 2219/008* (2013.01)

(58) Field of Classification Search
None
See application file for complete search history.

(56) References Cited

U.S. PATENT DOCUMENTS

| 2019/0380838 A1* | 12/2019 | Ghodbane | ............... A61L 27/48 |
| 2020/0009878 A1* | 1/2020 | Shih | ..................... B41J 2/04508 |
| 2021/0387416 A1* | 12/2021 | Mark | ...................... B33Y 10/00 |

* cited by examiner

*Primary Examiner* — Saptarshi Mazumder
(74) *Attorney, Agent, or Firm* — Maschoff Brennan

(57) ABSTRACT

A 3D model file storage method comprises executed by a computing device: obtaining a 3D model file, wherein the 3D model file comprises a plurality of polygon meshes; slicing the 3D model file along a specific direction to sequentially obtain a plurality of 2D profiles, wherein each of the plurality of 2D profiles comprises a plurality of polygons corresponding to the plurality of polygon meshes; generating a plurality of difference profiles respectively corresponding to the plurality of 2D profiles according to the plurality of 2D profiles and a logical exclusive or (XOR) operation; and storing the plurality of difference profiles sequentially along the specific direction.

9 Claims, 10 Drawing Sheets

3D MODEL FILE STORAGE METHOD, 3D MODEL FILE RECONSTRUCTION METHOD AND 3D PRINTING METHOD

CROSS-REFERENCE TO RELATED APPLICATIONS

This non-provisional application claims priority under 35 U.S.C. § 119(a) on Patent Application No(s). 112103779 filed in Republic of China (ROC) on Feb. 3, 2023, the entire contents of which are hereby incorporated by reference.

BACKGROUND

1. Technical Field

This disclosure relates to a 3D image processing technique, especially relates to a 3D model file storage method, 3D model file reconstruction method and 3D printing method.

2. Related Art

Generally, during the process of three-dimensional (3D) printing or modeling, the 3D model file is stored or displayed in the 3D processing device, and then transmitted to the 3D printing device or 3D modeling device. The 3D printing device then performs the printing process layer by layer based on multiple sliced images, or the 3D modeling device performs modeling or further performs rendering operations according to the 3D model file.

Therefore, the way to store, display, and transmit 3D model files with fewer storage space, and the way to implement corresponding encoding and decoding methods are important issues nowadays.

SUMMARY

Accordingly, this disclosure provides a 3D model file storage method, 3D model file reconstruction method and 3D printing method.

According to one or more embodiment of this disclosure, a 3D model file storage method comprises executing by a computing device: obtaining a 3D model file, wherein the 3D model file comprises a plurality of polygon meshes; slicing the 3D model file along a specific direction to sequentially obtain a plurality of two-dimensional (2D) profiles, wherein each of the plurality of 2D profiles comprises a plurality of polygons corresponding to the plurality of polygon meshes; generating a plurality of difference profiles respectively corresponding to the plurality of 2D profiles according to the plurality of 2D profiles and the logical exclusive OR operation (XOR); and storing the plurality of difference profiles sequentially along the specific direction.

According to one or more embodiment of this disclosure, a 3D model file reconstruction method comprises: obtaining a 3D model file by the first computing device, wherein the 3D model file comprises a plurality of polygon meshes; slicing the 3D model file along a specific direction by the first computing device to sequentially obtain a plurality of 2D profiles, wherein each of the plurality of 2D profiles comprises a plurality of polygons corresponding to the plurality of polygon meshes; generating a plurality of difference profiles respectively corresponding to the plurality of 2D profiles by the first computing device according to the plurality of 2D profiles and a logical exclusive or operation; and obtaining a plurality of 2D reconstruction profiles according to the plurality of difference profiles and the logical exclusive OR operation, and stacking the plurality of 2D reconstruction profiles along the specific direction to generate a 3D reconstruction model file corresponding to the 3D model file by the first computing device or a second computing device.

According to one or more embodiment of this disclosure, a 3D printing method comprises: obtaining a 3D model file by a computing device, wherein the 3D model file comprises a plurality of polygon meshes; slicing the 3D model file along a specific direction by the computing device to sequentially obtain a plurality of 2D profiles, wherein each of the plurality of 2D profiles comprises a plurality of polygons corresponding to the plurality of polygon meshes; generating a plurality of difference profiles respectively corresponding to the plurality of 2D profiles by the computing device according to the plurality of 2D profiles and a logical exclusive OR operation (XOR); and obtaining a plurality of 2D printing profiles according to the plurality of difference profiles and the logical exclusive or operation, and printing the plurality of 2D printing profiles along the specific direction to generate a 3D printed model corresponding to the 3D model file by a 3D printing device.

In view of the above description, the 3D model file storage method of the present disclosure can, by executing the logical exclusive or operation to the two neighboring 2D profiles formed by slicing the 3D model file including the polygon meshes, generate and store the difference profile between the two neighboring 2D profiles. Compared with directly storing all 2D profiles, storing the difference profiles can omit the information shared between the neighboring 2D profiles, hence the 3D model file storage method of the present disclosure can store 3D model files with smaller storage space without losing information basically. Based on this storage method, the 3D model file reconstruction method and 3D printing method of the present disclosure can further reconstruct the 3D model file or perform 3D printing through the logical exclusive OR operation (XOR), such that the memory space required for processing 3D model files may be significantly reduced with image information on the profile plane being preserved, and improve the overall efficiency.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. According to the description, claims and the drawings disclosed in the specification, one skilled in the art may easily understand the concepts and features of the present invention. The following embodiments further illustrate various aspects of the present invention, but are not meant to limit the scope of the present invention.

Figure 1:
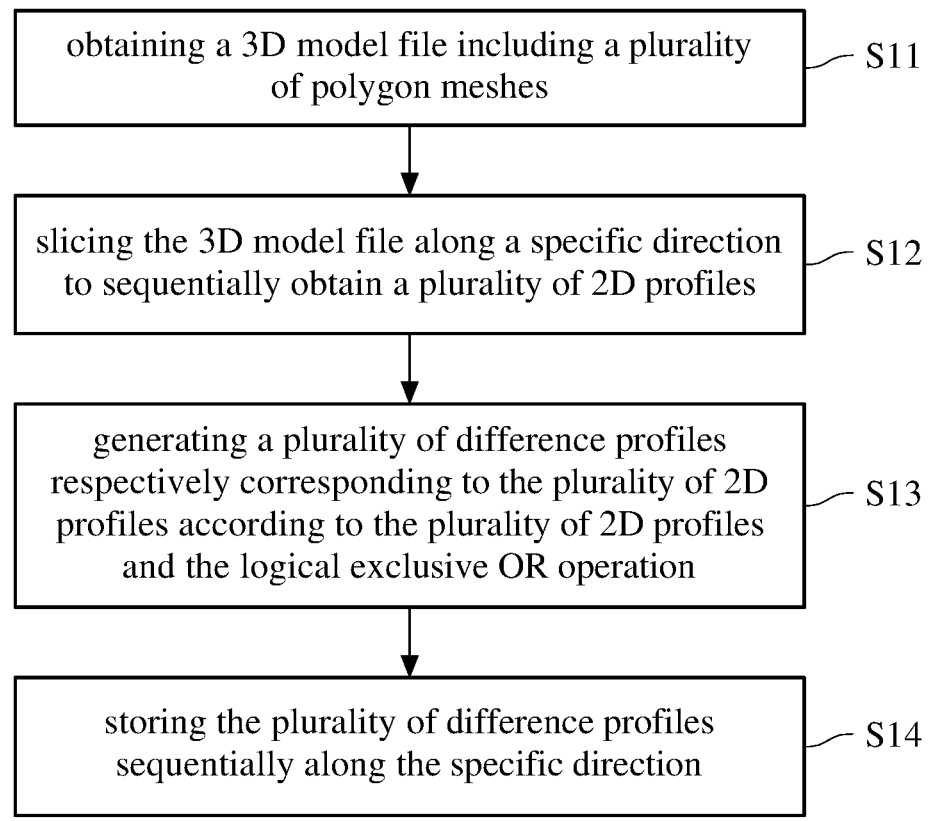
FIG. 1 is a flow chart of 3D model file storage method according to an embodiment of the present disclosure.

Please refer to FIG. 1 which is a flow chart of 3D model file storage method according to an embodiment of the present disclosure. As shown in FIG. 1, the 3D model file storage method comprises executed by a computing device: step S11: obtaining a 3D model file including a plurality of polygon meshes; step S12: slicing the 3D model file along a specific direction to sequentially obtain a plurality of 2D profiles; step S13: generating a plurality of difference profiles respectively corresponding to the plurality of 2D profiles according to the plurality of 2D profiles and a logical exclusive or operation; and step S14: storing the plurality of difference profiles sequentially along the specific direction. The above-mentioned steps are exemplarily illustrated in the following descriptions. In step S11, the computing device, such as a host computer with image processing function, can obtain a 3D model file pre-stored in a form of polygon meshes. Specifically, multiple vertices of the 3D model file may include a set of multiple mesh points on the polygon meshes, multiple edges of the 3D model file may include a connection set formed by connections between multiple mesh points on the polygon meshes, and multiple facets of the 3D model file may include a set of facets formed by connections between multiple mesh points on the polygon meshes. In addition, the polygon meshes may be triangular meshes or quadrilateral meshes, or the like, which are not limited in the present disclosure. In one implementation, the 3D model file initially obtained by the computing device may be provided with other information other than geometric information, such as rendering information, and the 3D model file may be pre-stored in other forms, such as voxel, in which case the computing device can then extract or transform the information of the 3D model file to obtain geometric information including a plurality of polygon meshes.

Figure 2:
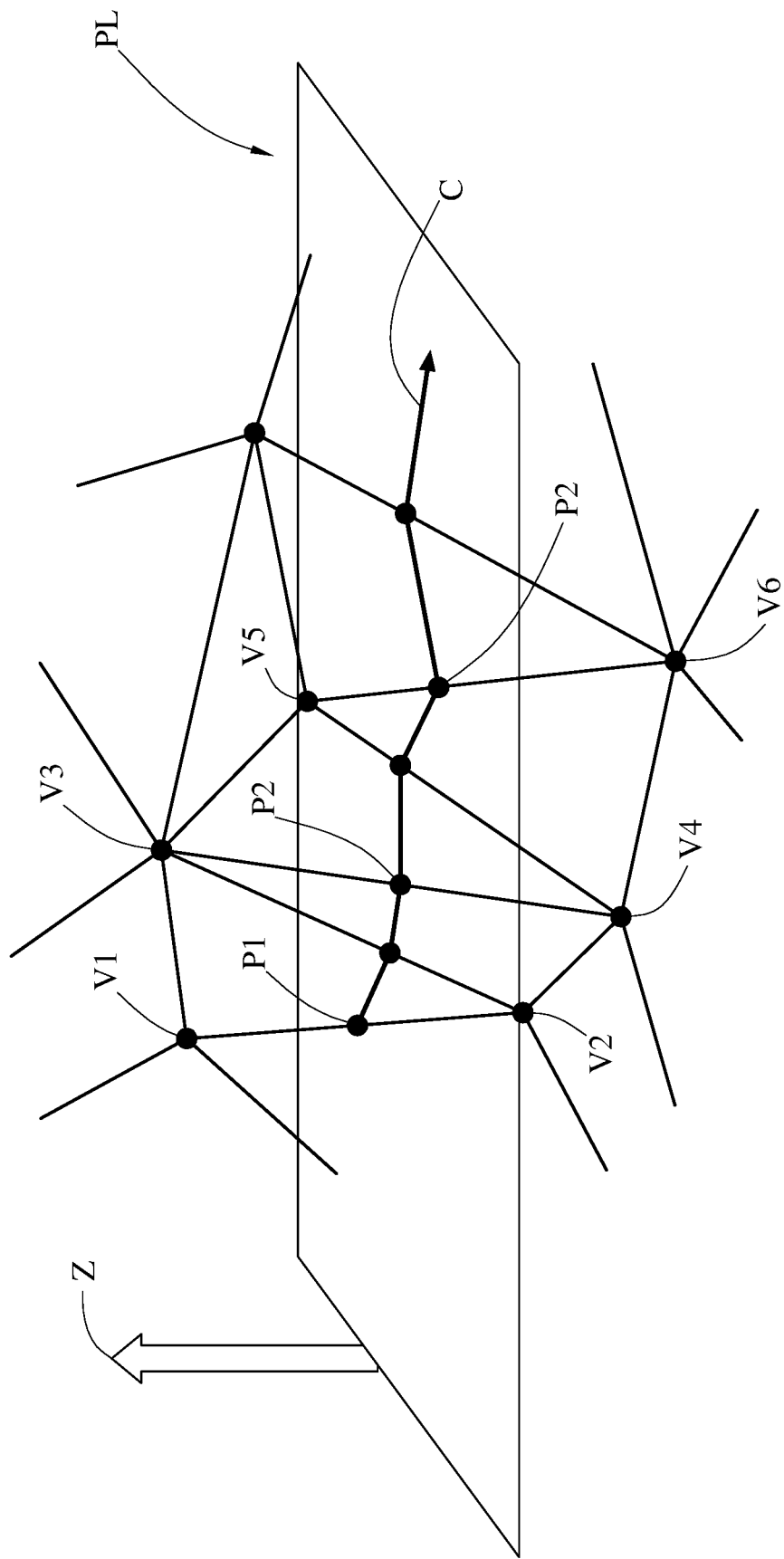
FIG. 2 schematically illustrates the step of performing slicing along the specific direction in the 3D model file storage method according to an embodiment of the present disclosure.

For step S12, please refer to FIG. 2 which schematically illustrates the step of performing slicing along the specific direction in the 3D model file storage method according to an embodiment of the present disclosure. As shown in FIG. 2, the vertices V1 to V6 of the 3D model file may be a plurality of mesh points on the triangular meshes. The computing device may obtain a plurality of 2D profiles sequentially by intersecting a virtual plane PL with a plurality of polygonal meshes of the 3D model file along a specific direction Z. Specifically, the computing device may move the plane PL along the specific direction Z in a step of a preset resolution ($\Delta z$) to intersect with the polygon grid layer by layer, that is, taking a 3D model file with a height (d) as an example, the computing device may perform slicing layer by layer and obtain a 2D profile with a specific number of layers (d/$\Delta z$, and "M" represents the total number of layers hereinafter). Further, when the vertices V1, V3, and V5 of the 3D model file in the polygon mesh are just above the plane PL, and the vertices V2, V4, and V6 are just below the plane PL, the plane PL may intersect the 3D model file at a point P1 between the vertices V1 and V2, a point P2 between the vertices V3 and V4, and a point P3 between the vertices V5 and V6 (same for other points on the plane). The above-mentioned "intersection" may be executed through interpolation or other numerical methods by the computing device, which is not limited in the present disclosure. In this way, the computing device can generate a 2D profile C according to multiple points on the plane PL, that is, for each layer corresponding to a specific position in the direction Z, the computing device generates a 2D profile C on the layer, wherein the 2D profile C may include a plurality of polygons. Also, since the 2D profile C is stored in a form of multiple polygons, each slicing layer may retain information in the direction of the plane PL (X and Y directions) without distortion.

Figure 3:
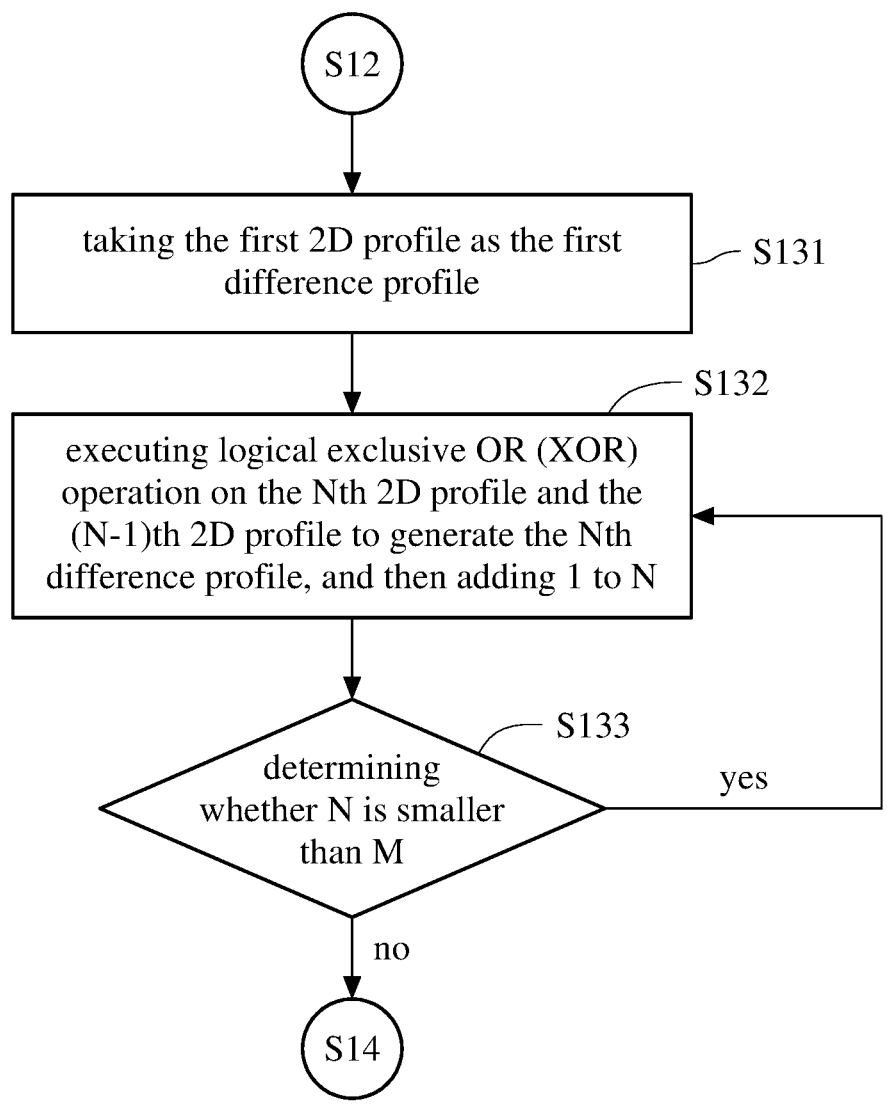
FIG. 3 is a flow chart of the step of generating difference profiles through logical exclusive or operation in the 3D model file storage method according to an embodiment of the present disclosure.

Please refer to FIG. 3 along with FIG. 1, wherein FIG. 3 is a flow chart of the step of generating difference profiles through logical exclusive or operation in the 3D model file storage method according to an embodiment of the present disclosure. As shown in FIG. 3, the step S13 after the step S12 of obtaining the 2D profile of the slicing may include step S131: taking the first 2D profile among the plurality of 2D profiles as the first difference profile; step S132: executing logical exclusive OR (XOR) operation on the Nth 2D profile and the (N−1)th 2D profile adjacent to each other to generate the Nth difference profile, and then adding 1 to N (the initial value of N is 2); step S133: determining whether N is smaller than M, if so, re-executing the above-mentioned step S132, otherwise executing the above-mentioned step S14 of sequentially storing the difference profile along the specific direction (such as Z axis), that is, step S14 is executed when N is not smaller than M. In addition, in step 14, the computing device may store the difference profile in the memory of the computing device itself, or transmit it to other memory or database for storage, which is not limited in the present disclosure. The above-mentioned steps are exemplarily illustrated in the following descriptions. In step S131, the first 2D profile which is the first slice or the last slice along the specific direction in the 3D model file can be stored as the first difference profile (in programing language, $X_1 = C_1$). Alternatively, the first 2D profile may be XORed with a zeroth 2D profile (an empty set) to generate a first difference profile (that is, the first 2D profile itself).

Figure 4C:
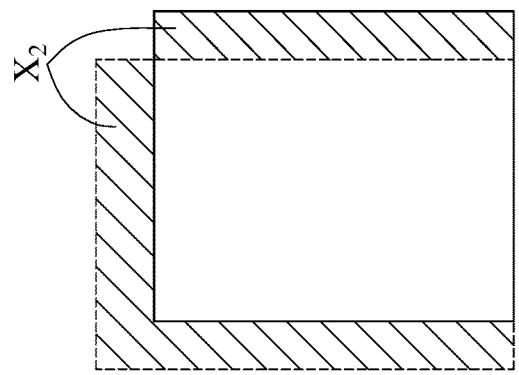
FIGS. 4a to 4c schematically illustrate the step of generating difference profiles through logical exclusive or operation in the 3D model file storage method according to an embodiment of the present disclosure.
Figure 4B:
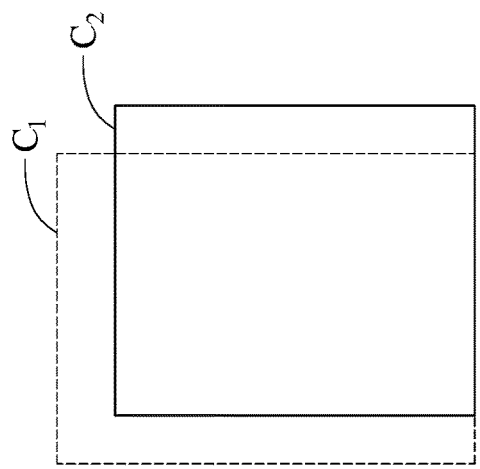
Figure 4A:
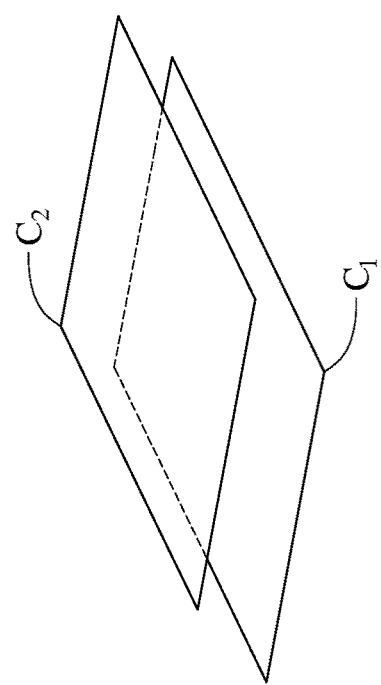

Please refer to FIG. 4a to FIG. 4c along with FIG. 3, wherein FIGS. 4a to 4c schematically illustrate the step of generating difference profiles through logical exclusive or operation in the 3D model file storage method according to an embodiment of the present disclosure. As shown in FIG. 4a to FIG. 4c, in step S132 (taking N as 2 as an example), the computing device may execute XOR operation on the first 2D profile $C_1$ and the second 2D profile $C_2$ adjacent to the first 2D profile $C_1$ to generate the second difference profile $X_2$ (in programing language, $X_N = C_{N-1} \oplus C_N$). For the 2D profiles containing multiple polygons obtained from the polygonal meshes, this step can be implemented by executing a Boolean algebra algorithm on the planar polygons, and the programing implementation can be implemented through codes obtained from open source such as Clipper 2, and the detailed description is omitted herein. Specifically, performing XOR operation is to obtain the difference between two 2D profiles, and the generated difference profiles can be stored in file formats such as a text format or a binary format, and the present disclosure is not limited thereto. For example, the first 2D profile $C_1$ stored in a binary format may be represented as $$\begin{pmatrix} 1 & 1 & 1 \\ 1 & 0 & 0 \\ 1 & 0 & 0 \end{pmatrix},$$

and the second 2D profile $C_2$ may be represented as $$\begin{pmatrix} 1 & 1 & 1 \\ 0 & 0 & 0 \\ 0 & 0 & 1 \end{pmatrix},$$

so the first difference profile ($X_1$) may be the same as the first 2D profile $C_1$, and the second difference profile $X_2$ may be $$\begin{pmatrix} 0 & 0 & 0 \\ 1 & 0 & 0 \\ 1 & 0 & 1 \end{pmatrix},$$

which is the difference between the two 2D profiles $C_1$ and $C_2$. Step S132 may also be referred to as a difference intersection process. In step S133, the computing device may determine whether N is smaller than the total number of layers M, if so, continue to execute the above-mentioned difference intersection process (step S132), otherwise execute the above-mentioned step S14, that is, the generation of all difference profiles is finished, and the computing device may store them sequentially along the specific direction (Z-axis).

Figure 5:
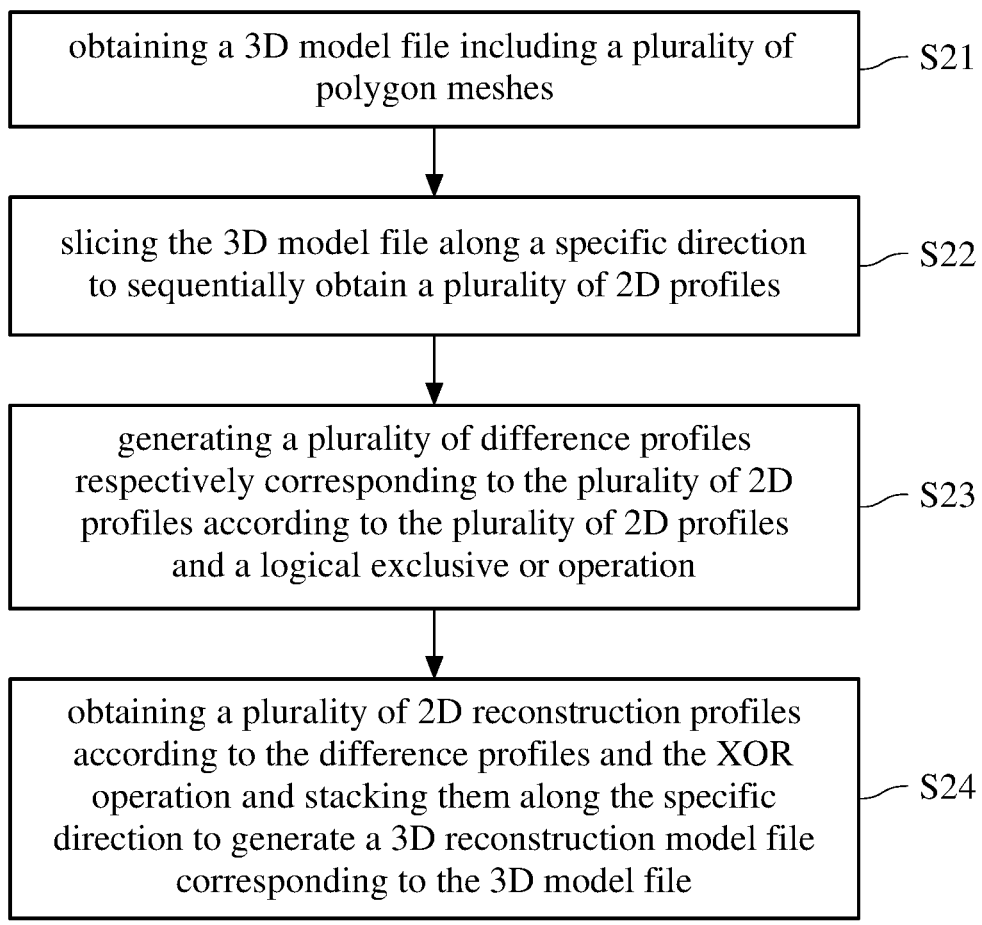
FIG. 5 is a flow chart of 3D model file reconstruction method according to another embodiment of the present disclosure.

Please refer to FIG. 5 which is a flow chart of 3D model file reconstruction method according to another embodiment of the present disclosure. As shown in FIG. 5, the 3D model file reconstruction method based on the above-mentioned 3D model file storage method includes: executing step S21 by a first computing device: obtaining a 3D model file including a plurality of polygonal meshes; executing step S22 by the first computing device: slicing the 3D model file along a specific direction to sequentially obtain a plurality of 2D profiles; executing step S23 by the first computing device: generating a plurality of difference profiles respectively corresponding to the plurality of 2D profiles according to the plurality of 2D profiles and XOR operation; and executing step S24 by the first computing device or the second computing device: obtaining a plurality of 2D reconstruction profiles according to the difference profiles and the XOR operation and stacking them along the specific direction to generate a 3D reconstruction model file corresponding to the 3D model file. Steps S21 to S23 of the present embodiment may be the same as steps S11 to S13 of the embodiment in FIG. 1. Particularly, step S23 may include steps S131 to S133 shown in FIG. 3, that is, the process of taking the first 2D profile as the first difference profile, and then XORing the two adjacent 2D profiles to generate a corresponding difference profile, which is not described repeatedly herein. In the present embodiment, each of the first computing device and the second computing device may be a host computer with image processing capability, to obtain a 3D model file pre-stored in a form of polygon meshes.

Figure 6:
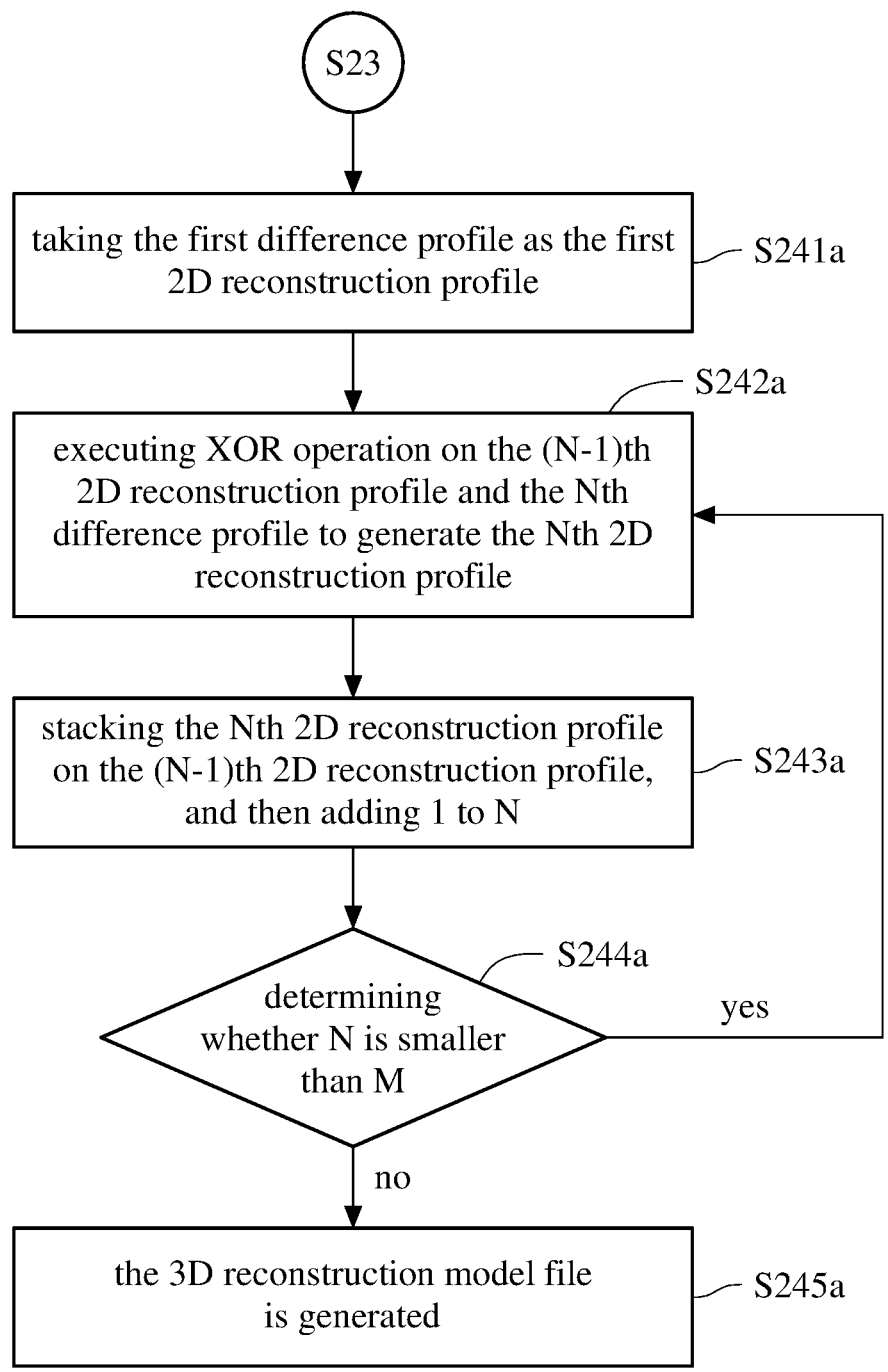
FIG. 6 is a flow chart of the step of generating 2D reconstruction profiles through logical exclusive or operation and performing stacking in the 3D model file reconstruction method according to another embodiment of the present disclosure.

Please refer to FIG. 6 along with FIG. 5, wherein FIG. 6 is a flow chart of the step of generating 2D reconstruction profiles through logical exclusive or operation and performing stacking in the 3D model file reconstruction method according to another embodiment of the present disclosure. As shown in FIG. 6, step S24 after step S23 of obtaining the difference profile may include: step S241a: taking the first difference profile as the first 2D reconstruction profile; step S242a: executing XOR operation on the (N−1)th 2D reconstruction profile and the Nth difference profile to generate the Nth 2D reconstruction profile (the initial value of N is 2); step S243a: stacking the Nth 2D reconstruction profile on the (N−1)th 2D reconstruction profile, and then adding 1 to N; and step S244a: determining whether N is smaller than M, if so, re-executing the above-mentioned step S242a, otherwise the 3D reconstruction model file is generated, which is step S245a. The above-mentioned steps are exemplarily illustrated in the following descriptions. In step S241a, the first difference profile which is the first slice or the last slice along the specific direction in the 3D model file can be stored as the first 2D reconstruction profile (in programing language, $C_1' = X_1$). Alternatively, the first difference profile may be XORed with the zeroth 2D profile (an empty set) to generate the first 2D reconstruction profile (that is, the first difference profile itself).

In step S242a (taking N as 2 as an example), the second computing device may execute XOR operation on the first 2D reconstruction profile ($C_1'$) and the second difference profile ($X_2$) that are adjacent to each other to generate a second 2D reconstruction profile ($C_2'$) (in programing language, $C_N' = C_{N-1}' \oplus X_N$). For the 2D profiles containing multiple polygons obtained from the polygonal meshes, this step can be implemented by executing a boolean algebra algorithm on the planar polygons, and the programing implementation can be implemented through codes obtained from open source such as Clipper 2, and the detailed description is omitted herein. For example, the first 2D reconstruction profile ($C_1'$) stored in a binary format may be represented as $$\begin{pmatrix} 1 & 1 & 1 \\ 1 & 0 & 0 \\ 1 & 0 & 0 \end{pmatrix},$$

and the second difference profile ($X_2$) may be represented as $$\begin{pmatrix} 0 & 0 & 0 \\ 1 & 0 & 0 \\ 1 & 0 & 1 \end{pmatrix},$$

so the second 2D reconstruction profile ($C_2'$) may be $$\begin{pmatrix} 1 & 1 & 1 \\ 0 & 0 & 0 \\ 0 & 0 & 1 \end{pmatrix},$$

which is the difference between the first 2D reconstruction profile ($C_1'$) and the second difference profile ($X_2$) obtained through the reflexive relation of the XOR operation (e.g. p⊕q⊕q=p). Next, in step S243a, the second computing device may stack the generated second 2D reconstruction profile on the first 2D reconstruction profile. It should be noted that, since after the 2D profile stored in a form of multiple polygons is sliced as shown in FIG. 2, each slicing layer may retain information in the direction of the plane PL (X and Y directions), so the 2D reconstruction profile (C') may be basically the same as the 2D profile (C). Also, steps S242a and S243a may be referred to as a stacking process. In step S244a, the second computing device may determine whether N is smaller than the total number of layers M, if so, continue to execute the above-mentioned stacking process, otherwise the generation of the 3D reconstruction model file is finished, that is, step S245a. It should be noted that, the first computing device and the second computing device of the present embodiment may be one device or two respective devices. For example, the two computing devices, such as two computers, may transmit data to each other through the cloud, so that the first computing device can execute the difference process after obtaining the 3D model file to generate difference profiles with smaller data and store it in the cloud database, and the second computing device can obtain the difference profiles from the cloud database and perform the stacking process to generate the 2D reconstruction profiles and the 3D reconstruction model files.

Figure 7:
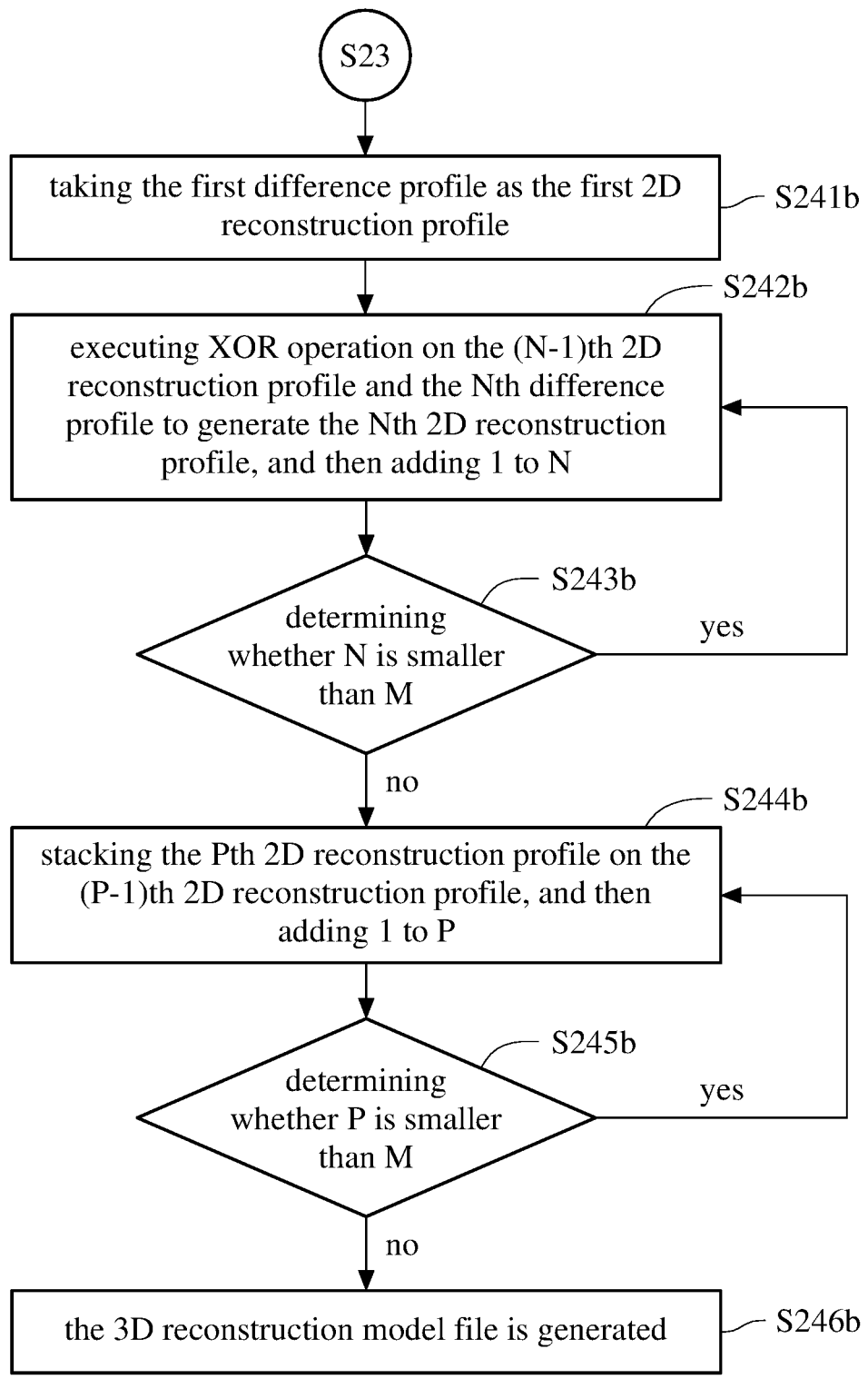
FIG. 7 is another flow chart of the step of generating 2D reconstruction profiles through logical exclusive or operation and performing stacking in the 3D model file reconstruction method according to another embodiment of the present disclosure.

Please refer to FIG. 7, which is another flow chart of the step of generating 2D reconstruction profiles through logical exclusive or operation and performing stacking in the 3D model file reconstruction method according to another embodiment of the present disclosure. As shown in FIG. 7, step S24 after step S23 of obtaining the difference profile may include: step S241b: taking the first difference profile as the first 2D reconstruction profile; step S242b: executing XOR operation on the (N−1)th 2D reconstruction profile and the Nth difference profile to generate the Nth 2D reconstruction profile, and then adding 1 to N (the initial value of N is 2); step S243b: determining whether N is smaller than M, if so, re-executing the above-mentioned step S242b, otherwise executing S244b, which means that step S244b is executed when N is not smaller than M; step S244b: stacking the Pth 2D reconstruction profile on the (P−1)th 2D reconstruction profile, and then adding 1 to P (the initial value of P is 2); step S245b: determining whether P is smaller than M, if so, re-executing the above-mentioned step S244b, otherwise the 3D reconstruction model file is generated, that is, step S246b is executed when P is not smaller than M. Steps S241b to S242b in the present embodiment are basically the same as steps S241a to S242a shown in FIG. 6, and the repeated descriptions will be omitted herein. At step S244b, or when N is not smaller than M, all of the 2D reconstruction profiles (N layers in total) are generated, so that the second computing device may sequentially stack the 2D reconstruction profiles along the specific direction (Z axis) to generate the 3D reconstruction model file in steps S244b to S245b. In addition, step S242b may be referred to as a difference intersection process, and step S244b may be referred to as a stacking process, wherein the XOR operation and the loop operation about parameters N and P are the same or similar as aforementioned descriptions, and the repeated description is omitted herein. Specifically, the main difference between the present embodiment and the embodiment shown in FIG. 6 is that, one is to stack one 2D reconstruction profile on the previous layer right after generating that 2D reconstruction profile; while another is to completely generate all 2D reconstruction profiles before stacking the 2D reconstruction profiles layer by layer.

Figure 8:
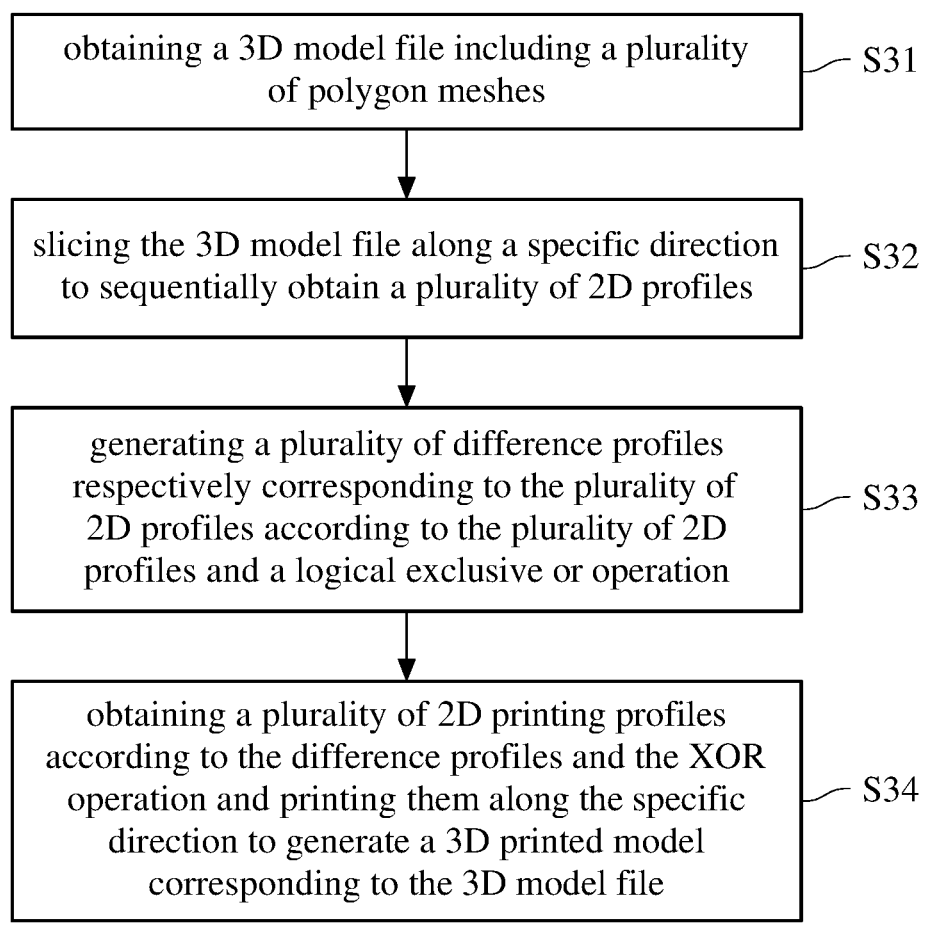
FIG. 8 is a flow chart of 3D printing method according to yet another embodiment of the present disclosure.

Please refer to FIG. 8, which is a flow chart of 3D printing method according to yet another embodiment of the present disclosure. As shown in FIG. 8, the 3D printing method based on the 3D model file storage method includes: executing step S31 by the computing device: obtaining a 3D model file including a plurality of polygonal meshes; executing step S32 by the computing device: slicing the 3D model file along a specific direction to sequentially obtain a plurality of 2D profiles; executing step S33 by the computing device: generating a plurality of difference profiles respectively corresponding to the plurality of 2D profiles according to the plurality of 2D profiles and XOR operation; and executing step S34 by the 3D printing device: obtaining a plurality of 2D printing profiles according to the difference profiles and the XOR operation and printing them along the specific direction to generate a 3D printed model corresponding to the 3D model file. Steps S31 to S33 of the present embodiment may be the same as steps S11 to S13 of the embodiment in FIG. 1. Particularly, step S33 may include steps S131 to S133 shown in FIG. 3, that is, the process of taking the first 2D profile as the first difference profile, and then XORing the two adjacent 2D profiles to generate a corresponding difference profile, which is not described repeatedly herein. In addition, the 3D printing device in the present disclosure may be a 3D printing machine provided with a main control computer, wherein the main control computer may include a computing device configured to perform steps S31-S33 and another computing device configured to process data and calculation, and the 3D printing machine is configured to perform the printing function.

Figure 9:
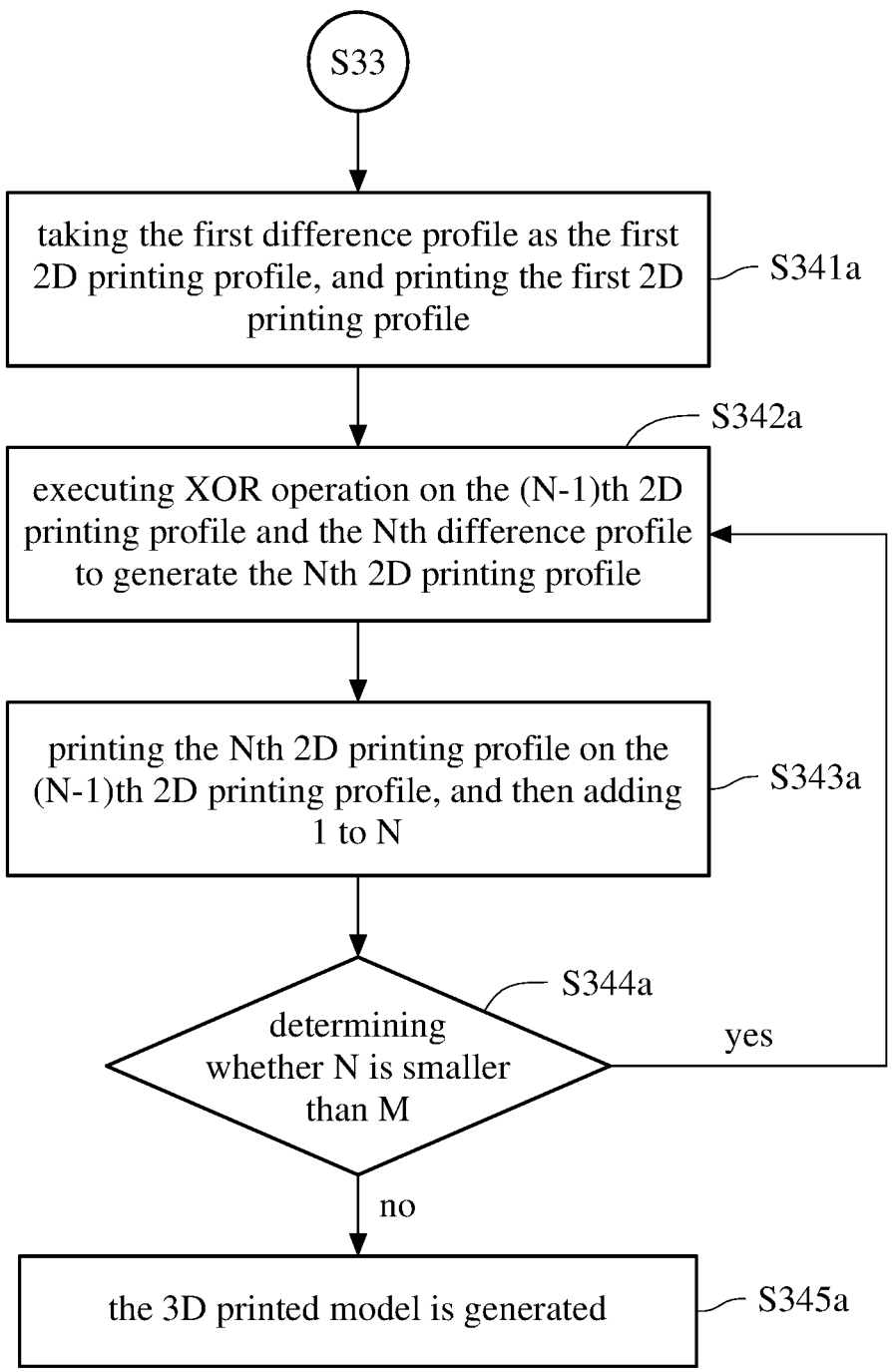
FIG. 9 is a flow chart of the step of generating 2D printing profiles through logical exclusive or operation and performing printing in the 3D printing method according to yet another embodiment of the present disclosure.

Please refer to FIG. 9 along with FIG. 8, wherein FIG. 9 is a flow chart of the step of generating 2D printing profiles through logical exclusive or operation and performing printing in the 3D printing method according to yet another embodiment of the present disclosure. As shown in FIG. 9, step S34 after step S33 of obtaining the difference profiles may include: step S341a: taking the first difference profile as the first 2D printing profile, and printing the first 2D printing profile; step S342a: executing XOR operation on the (N−1)th 2D printing profile and the Nth difference profile to generate the Nth 2D printing profile (the initial value of N is 2); step S343a: printing the Nth 2D printing profile on the (N−1)th 2D printing profile, and then adding 1 to N; and step S344a: determining whether N is smaller than M, if so, re-executing the above-mentioned step S342a, otherwise the 3D printed model corresponding to the 3D model file is generated, which is step S345a. The above-mentioned steps are exemplarily illustrated in the following descriptions. In step S341a, the first difference profile which is the first slice or the last slice along the specific direction in the 3D model file can be stored as the first 2D printing profile (in programing language, $C_1''=X_1$). Alternatively, the first difference profile may be XORed with a zeroth 2D profile (an empty set) to generate a first 2D printing profile (that is, the first difference profile itself). The 3D printing device can then print the first 2D printing profile on a plane.

In step S342a (taking N as 2 as an example), the 3D printing device may execute XOR operation on the first 2D printing profile ($C_1''$) and the second difference profile ($X_2$) to generate a second 2D printing profile ($C_2''$) (in programing language, $C_N''=C_{N-1}'' \oplus X_N$). For example, the first 2D printing profile ($C_1''$) stored in a binary format may be represented as $$\begin{pmatrix} 1 & 1 & 1 \\ 1 & 0 & 0 \\ 1 & 0 & 0 \end{pmatrix},$$

and the second difference profile ($X_2$) may be represented as $$\begin{pmatrix} 0 & 0 & 0 \\ 1 & 0 & 0 \\ 1 & 0 & 1 \end{pmatrix},$$

so the second 2D printing profile ($C_2''$) may be $$\begin{pmatrix} 1 & 1 & 1 \\ 0 & 0 & 0 \\ 0 & 0 & 1 \end{pmatrix},$$

Next, in step S343a, the 3D printing device may print the generated second 2D printing profile on the first 2D printing profile. Also, steps S342a and S343a may be referred to as a printing process. In step S344a, the 3D printing device may determine whether N is smaller than the total number of layers M, if so, continue to execute the above-mentioned printing process, otherwise the generation of the 3D printed model is finished, that is, step S345a. It should be noted that, the computing device in the present embodiment, such as a computer, may transmit data to the 3D printing device through the cloud, so that the 3D printing device can obtain the difference profiles from the cloud database and generate the 2D printing profiles for performing the printing process.

Figure 10:
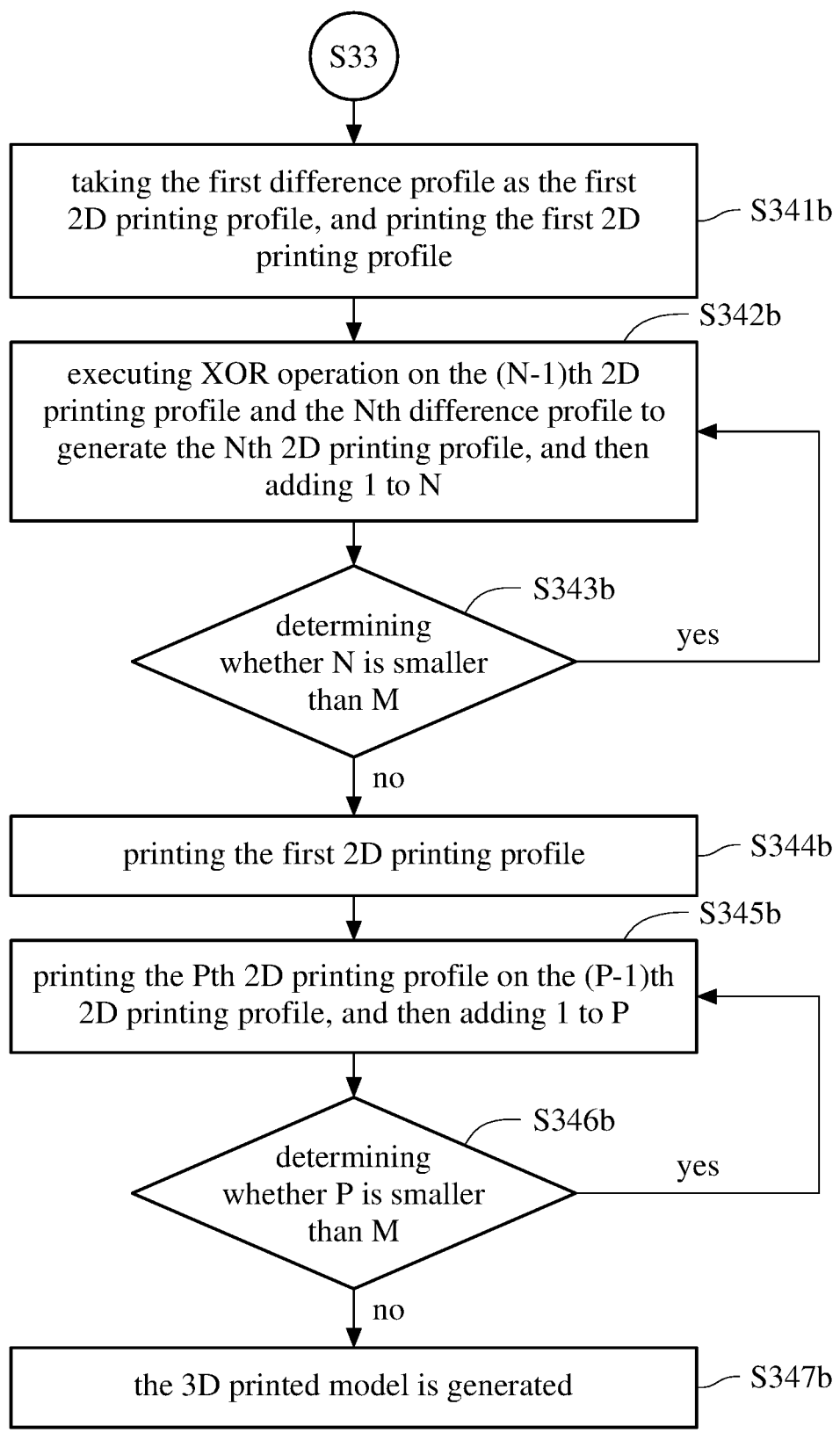
FIG. 10 is another flow chart of the step of generating 2D printing profiles through logical exclusive or operation and performing printing in the 3D printing method according to yet another embodiment of the present disclosure.

Please refer to FIG. 10, which is another flow chart of the step of generating 2D printing profiles through logical exclusive or operation and performing printing in the 3D printing method according to yet another embodiment of the present disclosure. As shown in FIG. 10, step S34 after step S33 of obtaining the difference profiles may include: step S341b: taking the first difference profile as the first 2D printing profile; step S342b: executing XOR operation on the (N−1)th 2D printing profile and the Nth difference profile to generate the Nth 2D printing profile, and then adding 1 to N (the initial value of N is 2); step S343b: determining whether N is smaller than M, if so, re-executing the above-mentioned step S342b, otherwise executing S344b, which means that step S344b is executed when N is not smaller than M; step S344b: printing the first 2D printing profile; step S345b: printing the Pth 2D printing profile on the (P−1)th 2D printing profile, and then adding 1 to P (the initial value of P is 2); step S346b: determining whether P is smaller than M, if so, re-executing the above-mentioned step S345b, otherwise the 3D printed model is generated, that is, step S347b is executed when P is not smaller than M. Steps S341b to S342b in the present embodiment are basically the same as steps S341a to S342a shown in FIG. 9, and the repeated descriptions will be omitted herein. At step S344b, or when N is not smaller than M, all of the 2D printing profiles (N layers in total) are generated, so that the 3D printing device may sequentially print the 2D printing profiles along the specific direction (Z axis) to generate the 3D printed model in steps S344b to S346b. In addition, step S342b may be referred to as a difference intersection process, and step S345b may be referred to as a printing process, wherein the XOR operation and the loop operation about parameters N and P are the same or similar as aforementioned descriptions, and the repeated description is omitted herein. Specifically, the main difference between the present embodiment and the embodiment shown in FIG. 9 is that, one is to print one 2D printing profile on the previous layer right after generating that 2D printing profile; while another is to completely generate all 2D printing profiles before printing the 2D printing profiles layer by layer.

In view of the above description, the 3D model file storage method of the present disclosure can, by executing the exclusive or (XOR) operation to the two neighboring 2D profiles formed by slicing the 3D model file including the polygon meshes, generate and store the difference profile between the two neighboring 2D profiles. Compared with directly storing all 2D profiles, storing the difference profiles can omit the information shared between the neighboring 2D profiles, hence the 3D model file storage method of the present disclosure can store 3D model files with smaller storage space without losing information basically. Based on this storage method, the 3D model file reconstruction method and 3D printing method of the present disclosure can further reconstruct the 3D model file or perform 3D printing through the XOR operation, such that the memory space required for processing 3D model files may be significantly reduced with image information on the profile plane being preserved, and improve the overall efficiency.

Although the present invention is disclosed in the foregoing embodiments, it is not intended to limit the present invention. Change and modifications made without departing from the spirit and scope of the present invention belong to the scope of the present invention. For the protection scope defined by the present invention, please refer to the attached claims.

What is claimed is:

1. A 3D model file storage method, comprising executed by a computing device, comprising:
   obtaining a 3D model file, wherein the 3D model file comprises a plurality of polygon meshes;
   slicing the 3D model file along a specific direction to sequentially obtain a plurality of 2D profiles, wherein each of the plurality of 2D profiles comprises a plurality of polygons corresponding to the plurality of polygon meshes;
   generating a plurality of difference profiles respectively corresponding to the plurality of 2D profiles according to the plurality of 2D profiles and an XOR operation; and
   storing the plurality of difference profiles sequentially along the specific direction,
   wherein a number of the plurality of 2D profiles is M, and generating the plurality of difference profiles respectively corresponding to the plurality of 2D profiles according to the plurality of 2D profiles and the XOR operation comprises:
   taking a first 2D profile among the plurality of 2D profiles as a first difference profile;
   executing a difference intersection process comprising:
   executing the XOR operation on an Nth 2D profile and an (N−1)th 2D profile adjacent to each other among the plurality of 2D profiles to generate an Nth difference profile as one of the plurality of difference profiles; and adding 1 to N, and determining whether N is smaller than M;

when N is smaller than M, re-executing the difference intersection process;

wherein storing the plurality of difference profiles sequentially along the specific direction is executed when N is not smaller than M, and an initial value of N is 2.

2. A 3D model file reconstruction method, comprising:

obtaining a 3D model file by a first computing device, wherein the 3D model file comprises a plurality of polygon meshes;

slicing the 3D model file along a specific direction by the first computing device to sequentially obtain a plurality of 2D profiles, wherein each of the plurality of 2D profiles comprises a plurality of polygons corresponding to the plurality of polygon meshes;

generating a plurality of difference profiles respectively corresponding to the plurality of 2D profiles by the first computing device according to the plurality of 2D profiles and an XOR operation; and obtaining a plurality of 2D reconstruction profiles according to the plurality of difference profiles and the XOR operation, and stacking the plurality of 2D reconstruction profiles along the specific direction to generate a 3D reconstruction model file corresponding to the 3D model file by the first computing device or a second computing device.

3. The 3D model file reconstruction method of claim 2, wherein a number of the plurality of 2D profiles is M, and generating the plurality of difference profiles respectively corresponding to the plurality of 2D profiles according to the plurality of 2D profiles and the XOR operation comprises:

taking a first 2D profile among the plurality of 2D profiles as a first difference profile;

executing a difference intersection process comprising:
executing the XOR operation on an Nth 2D profile and an (N−1)th 2D profile adjacent to each other among the plurality of 2D profiles to generate an Nth difference profile as one of the plurality of difference profiles; and adding 1 to N, and determining whether N is smaller than M;

when N is smaller than M, re-executing the difference intersection process;

wherein obtaining the plurality of 2D reconstruction profiles according to the plurality of difference profiles and the XOR operation is executed when N is not smaller than M, and an initial value of N is 2.

4. The 3D model file reconstruction method of claim 2, wherein a number of the plurality of 2D profiles is M, and obtaining the plurality of 2D reconstruction profiles according to the plurality of difference profiles and the XOR operation, and stacking the plurality of 2D reconstruction profiles along the specific direction to generate the 3D reconstruction model file corresponding to the 3D model file comprises:

taking a first difference profile in the specific direction among the plurality of difference profiles as a first 2D reconstruction profile of the plurality of 2D reconstruction profiles;

executing a stacking process comprising:
performing the XOR operation on an (N−1)th 2D reconstruction profile and an Nth difference profile among the plurality of difference profiles to generate an Nth 2D reconstruction profile as one of the plurality of 2D reconstruction profiles;

stacking the Nth 2D reconstruction profile on the (N−1)th 2D reconstruction profile along the specific direction to generate a part of the 3D reconstruction model file; and adding 1 to N, and determining whether N is smaller than M;

when N is smaller than M, re-executing the stacking process; and when N is not smaller than M, generating the 3D reconstruction model file is finished, wherein an initial value of N is 2.

5. The 3D model file reconstruction method of claim 2, wherein a number of the plurality of 2D profiles is M, and obtaining the plurality of 2D reconstruction profiles according to the plurality of difference profiles and the XOR operation, and stacking the plurality of 2D reconstruction profiles along the specific direction to generate the 3D reconstruction model file corresponding to the 3D model file comprises:

taking a first difference profile in the specific direction among the plurality of difference profiles as a first 2D reconstruction profile of the plurality of 2D reconstruction profiles;

executing a difference intersection process comprising:
performing the XOR operation on an (N−1)th 2D reconstruction profile and an Nth difference profile among the plurality of difference profiles to generate an Nth 2D reconstruction profile as one of the plurality of 2D reconstruction profiles; and adding 1 to N, and determining whether N is smaller than M;

when N is smaller than M, re-executing the difference intersection process, wherein an initial value of N is 2; and when N is not smaller than M, stacking the plurality of 2D reconstruction profiles along the specific direction to generate the 3D reconstruction model file.

6. A 3D printing method, comprising:

obtaining a 3D model file by a computing device, wherein the 3D model file comprises a plurality of polygon meshes;

slicing the 3D model file along a specific direction by the computing device to sequentially obtain a plurality of 2D profiles, wherein each of the plurality of 2D profiles comprises a plurality of polygons corresponding to the plurality of polygon meshes;

generating a plurality of difference profiles respectively corresponding to the plurality of 2D profiles by the computing device according to the plurality of 2D profiles and an XOR operation; and obtaining a plurality of 2D printing profiles according to the plurality of difference profiles and the XOR operation, and printing the plurality of 2D printing profiles along the specific direction to generate a 3D printed model corresponding to the 3D model file by a 3D printing device.

7. The 3D printing method of claim 6, wherein a number of the plurality of 2D profiles is M, and generating the plurality of difference profiles respectively corresponding to the plurality of 2D profiles according to the plurality of 2D profiles and the XOR operation comprises:

taking a first 2D profile among the plurality of 2D profiles as a first difference profile;

executing a difference intersection process comprising:
- executing the XOR operation on an Nth 2D profile and an (N−1)th 2D profile adjacent to each other among the plurality of 2D profiles to generate an Nth difference profile as one of the plurality of difference profiles; and
- adding 1 to N, and determining whether N is smaller than M;
- when N is smaller than M, re-executing the difference intersection process;
- wherein obtaining the plurality of 2D printing profiles according to the plurality of difference profiles and the XOR operation is executed when N is not smaller than M, and an initial value of N is 2.

8. The 3D printing method of claim 6, wherein a number of the plurality of 2D profiles is M, and obtaining the plurality of 2D printing profiles according to the plurality of difference profiles and the XOR operation, and printing the plurality of 2D printing profiles along the specific direction to generate the 3D printed model corresponding to the 3D model file comprises:
- taking a first difference profile in the specific direction among the plurality of difference profiles as a first 2D printing profile of the plurality of 2D printing profiles;
- printing the first 2D printing profile;
- executing a printing process comprising:
  - performing the XOR operation on an (N−1)th 2D printing profile and an Nth difference profile among the plurality of difference profiles to generate an Nth 2D printing profile as one of the plurality of 2D printing profiles;
  - printing the Nth 2D printing profile on the (N−1)th 2D printing profile along the specific direction to generate a part of the 3D printed model; and
  - adding 1 to N, and determining whether N is smaller than M;
- when N is smaller than M, re-executing the printing process; and
- when N is not smaller than M, generating the 3D printed model is finished,
wherein an initial value of N is 2.

9. The 3D printing method of claim 6, wherein a number of the plurality of 2D profiles is M, and obtaining the plurality of 2D printing profiles according to the plurality of difference profiles and the XOR operation, and printing the plurality of 2D printing profiles along the specific direction to generate the 3D printed model corresponding to the 3D model file comprises:
- taking a first difference profile in the specific direction among the plurality of difference profiles as a first 2D printing profile of the plurality of 2D printing profiles;
- executing a difference intersection process comprising:
  - executing the XOR operation on an (N−1)th 2D printing profile and an Nth difference profile among the plurality of difference profiles to generate an Nth 2D printing profile as one of the plurality of 2D printing profiles; and
  - adding 1 to N, and determining whether N is smaller than M;
- when N is smaller than M, re-executing the difference intersection process, wherein an initial value of N is 2; and
- when N is not smaller than M, printing the plurality of 2D printing profiles along the specific direction to generate the 3D printed model.

\* \* \* \* \*